(12) United States Patent
Sultan et al.

(10) Patent No.: US 8,837,281 B2
(45) Date of Patent: Sep. 16, 2014

(54) USE OF PARTITIONS TO REDUCE FLOODING AND FILTERING DATABASE SIZE REQUIREMENTS IN LARGE LAYER TWO NETWORKS

(75) Inventors: Robert Sultan, Somers, NY (US); T. Benjamin Mack-Crane, Downers Grove, IL (US); Linda Dunbar, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 342 days.

(21) Appl. No.: 13/229,282

(22) Filed: Sep. 9, 2011

(65) Prior Publication Data

US 2012/0063306 A1 Mar. 15, 2012

Related U.S. Application Data

(60) Provisional application No. 61/381,813, filed on Sep. 10, 2010.

(51) Int. Cl.
*H04L 12/26* (2006.01)

(52) U.S. Cl.
USPC .......................................................... 370/230

(58) Field of Classification Search
None
See application file for complete search history.

(56) References Cited

U.S. PATENT DOCUMENTS

| | | | | |
|---|---|---|---|---|
| 6,307,837 | B1 * | 10/2001 | Ichikawa et al. ............... | 370/230 |
| 2008/0080535 | A1 | 4/2008 | Li et al. | |
| 2008/0144644 | A1 | 6/2008 | Allan et al. | |
| 2009/0141622 | A1 * | 6/2009 | Bitar ............................. | 370/225 |

FOREIGN PATENT DOCUMENTS

| | | |
|---|---|---|
| CN | 101072239 A | 11/2007 |
| CN | 101155136 A | 4/2008 |
| EP | 2112787 A1 | 10/2009 |

OTHER PUBLICATIONS

"Virtual Bridged Local Area Networks—Amendment XX: Edge Virtual Bridging," Draft Standard for Local and Metropolitan Networks, P802.1Qbg/D1.7, IEEE, Aug. 22, 2011, 179 pages.
"Virtual Bridged Local Area Networks—Amendment XX: Edge Virtual Bridging," Draft Standard for Local and Metropolitan Networks, P802.1Qbg/D1.3, IEEE, Dec. 20, 2010, 171 pages.
"Virtual Bridged Local Area Networks—Amendment XX: Edge Virtual Bridging," Draft Standard for Local and Metropolitan Networks, P802.1Qbg/D1.2, IEEE, Oct. 21, 2010, 83 pages.

(Continued)

*Primary Examiner* — Minh-Trang Nguyen
(74) *Attorney, Agent, or Firm* — Conley Rose, P.C.; Grant Rodolph; William H. Dietrich (57) ABSTRACT

A network component, comprising a memory unit comprising a filtering database (FDB), wherein the FDB comprises a medium access control (MAC) address and a Virtual Local Area Networks (VLAN) Identifier (VID) pair for each of a plurality of end-stations associated with an edge-district partition of a network, wherein the edge-district partition is associated with the network component, and wherein the FDB comprises a wildcard FDB entry corresponding to each VLAN associated with the network component, and a logic unit coupled to the ingress ports and the egress ports, wherein the logic unit is configured to reduce flooding in the edge-district partition of the network; wherein the logic unit is configured to forward a received frame, having a destination MAC address and a VID for which there is not an exact match in the FDB, towards a core-bridge without flooding based on the wildcard entry in the FDB.

20 Claims, 6 Drawing Sheets

(56) References Cited

OTHER PUBLICATIONS

"Virtual Bridged Local Area Networks—Amendment XX: Edge Virtual Bridging," Draft Standard for Local and Metropolitan Networks, P802.1Qbg/D1.4, IEEE, Mar. 10, 2011, 172 pages.
"Virtual Bridged Local Area Networks—Amendment XX: Edge Virtual Bridging," Draft Standard for Local and Metropolitan Networks, P802.1Qbg/D1.5, IEEE, Mar. 31, 2011, 166 pages.
"Virtual Bridged Local Area Networks—Amendment XX: Edge Virtual Bridging," Draft Standard for Local and Metropolitan Networks, P802.1Qbg/D1.6, IEEE, Jun. 30, 2011, 206 pages.
"Virtual Bridged Local Area Networks," IEEE Standard for Local and Metropolitan Area Networks, IEEE Standard 802.1Q, 2005, 303 pages.
"Media Access Control (MAC) Bridges and Virtual Bridge Local Area Networks," IEEE Standard for Local and Metropolitan Area Networks, IEEE Computers Society, IEEE Std. 802.1Q-2011, Aug. 31, 2011, 1365 pages.
Foreign Communications from a Counterpart Application, PCT Application PCT/CN2011/079559, International Search Report, Dated Dec. 22, 2011, 3 pages.
Carl-Mitchell, S., et al., "Using ARP to Implement Transparent Subnet Gateway," RFC 1027, Oct. 1987, 9 pages.
Cheshire, S., "IPv4 Address Conflict Detection," RFC 5227, Jul. 2008, 22 pages.
Christensen, M., et al., "Considerations for Internet Group Management Protocol (IGMP) and Multicast Listener Discovery (MLD) Snooping Switches," RFC 4541, May 2006, 17 pages.
Narten, T., et al., "Neighbor Discovery for IP Version 6 (IPv6)," RFC 4861, 98 pages, Sep. 2007.
Plummer, D.C., "An Ethernet Address Resolution Protocol or Converting Network Protocol Addresses to 48.bit Ethernet Address for Transmission on Ethernet Hardware," RFC 826, Nov. 1982, 11 pages.
Thaler, D., et al., "Neighbor Discovery Proxies (ND Proxy)," RFC 4389, Apr. 2006, 19 pages.
Thaler, D., "Multi-Link Subnet Issues," RFC 4903, May 2007, 18 pages.
Karir, M., et al., "Address Resolution Statistics," draft-karir-armd-statistics-00.txt, Jul. 1, 2011, 14 pages.
Karir, M., et al., "Address Resolution Statistics," draft-karir-armd-statistics-01.txt, Jul. 10, 2011, 14 pages.
Shah, H., et al., "ARP Reduction in Data Center," draft-shah-armd-arp-reduction-00.txt, Oct. 18, 2010, 10 pages.
Shah, H., et al., "ARP Broadcast Reduction for Large Data Centers," draft-shah-armd-arp-reduction-01.txt, Oct. 25, 2010, 12 pages.
Thaler, D., et al., "Multi-Link Subnet Support in IPv6," draft-ietf-ipv6-multilink-subnets-00.txt, Jun. 29, 2002, 16 pages.

* cited by examiner

USE OF PARTITIONS TO REDUCE FLOODING AND FILTERING DATABASE SIZE REQUIREMENTS IN LARGE LAYER TWO NETWORKS

CROSS-REFERENCE TO RELATED APPLICATIONS

The present application claims priority to U.S. Provisional Patent Application Ser. No. 61/381,813 filed Sep. 10, 2010 by Robert Sultan et al., and entitled, "Use of Districts to Reduce Flooding and Filtering Database Size Requirements in Large Layer Two Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A Local Area Network (LAN) comprises a plurality of Bridging devices interconnected by links. Each Bridge contains a Filtering Database (FDB) that is referenced by frames traversing the LAN. The LAN comprises a plurality of Virtual Local Area Networks (VLANs). Each VLAN is associated with a spanning tree topology. A plurality of end-stations is attached to each VLAN. A VLAN is identified by a VLAN Identifier (VID). An end-station is identified by a Medium Access Control (MAC) address.

The number of end-stations associated with VLAN can grow large. This may be the case in virtualization environments, where a single physical server can contain multiple virtual servers. A virtual server performs the functions of a physical server but is instantiated by a logical entity known as a 'virtual machine' (VM). The increased number of end-stations associated with the introduction of virtual servers can impact the bandwidth consumed on links in two ways. First, if the number of <MAC, VID> pairs associated with the LAN exceeds the capacity of the FDB, FDB entries are displaced. A received frame corresponding to a displaced FDB entry is flooded (i.e., propagated on a plurality of links) on the spanning tree associated with the specified VID. The result is that link capacity consumed generally on links within a VLAN can increase significantly when the number of referenced end-stations grows beyond a threshold value related to the size of the FDB. Second, where the capacity of the FDB is sufficient to hold the plurality of referenced <MAC, VID> pairs, flooding occurs when an end-station is first attached to the VLAN or has been aged from the FDB. Such activity can be expected to increase as the total number of end-stations associated with the network grows larger. The resultant flooding increases bandwidth consumption on a plurality of links of the spanning tree associated with the VLAN. The above issues suggest problems of scale when increasing numbers of end-stations are associated with VLANs in a network such as a data center network.

SUMMARY

In an embodiment, the disclosure includes a network component, comprising a memory unit comprising a filtering database (FDB), wherein the FDB comprises a medium access control (MAC) address and a Virtual Local Area Networks (VLAN) Identifier (VID) pair for each of a plurality of end-stations associated with an edge-district partition of a network, wherein the edge-district partition is associated with the network component, and wherein the FDB comprises a wildcard FDB entry corresponding to each VLAN associated with the network component, and a logic unit coupled to the ingress ports and the egress ports, wherein the logic unit is configured to reduce flooding in the edge-district partition of the network; wherein the logic unit is configured to forward a received frame, having a destination MAC address and a VID for which there is not an exact match in the FDB, towards a core-bridge without flooding based on the wildcard entry in the FDB.

In an embodiment, the disclosure includes a system for managing flooding in a partitioned data center network, comprising a core bridge, and a set of edge-district bridges corresponding to different edge-districts of the partitioned data center network, wherein each edge-district bridge is connected by an internal point-to-point link to the core-bridge, wherein each of the set of edge-district bridges is configured to refrain from flooding a frame to others of the set of edge-district bridges when a frame originating from inside the partitioned data center network had a destination that is outside the partitioned data center network.

In an embodiment, the disclosure includes a network component implemented method, comprising receiving, by a communication bridge, a frame, determining, by the communication bridge, that a source of the frame is within a local edge-district partition and that a destination of the frame is outside the local edge-district partition, and in response to said determination, forwarding the frame towards a destination outside the local edge-district partition without flooding the frame within the local edge-district partition.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a technique for partitioning a layer 2 network into a core-district and multiple edge-districts such that the filtering database (FDB) in a bridge within an edge-district partition need only maintain FDB entries corresponding to end-stations associated with that edge-district partition. Thus, edge-district partitions can be configured to be sufficiently small so as to guarantee that the worst-case number of occupied FDB entries does not exceed the FDB capacity. In this manner, displacement of FDB entries and the resulting unknown unicast flooding is avoided. As used herein, "flooding" refers to the forwarding of a received unicast frame on multiple links as occurs when the FDB does not contain an entry with a Medium Access Control (MAC) address and Virtual Local Area Network Identifier (VID), hereafter denoted as <MAC, VID>, corresponding to the Destination MAC Address (DA) and VID associated with the frame and the FDB cannot, therefore, be used to identify a single port on which the frame is to be forwarded. Further, the disclosed method ensures that a frame addressed to a <DA, VID> is flooded only within the single edge-district partition containing the end-station associated with that <DA, VID> and only when the outbound-port associated with that <DA, VID> has not yet been learned in the destination edge-district partition. Thus, a frame sent from an edge-district partition to a remote edge-district partition can cause flooding only in the destination edge-district partition and only in the case that the outbound-port associated with the <MAC, VID> has not yet been learned within the remote edge district partition. Such a frame does not cause flooding in the source edge-district partition or any other edge-district partition. A frame sent from a source end-station to a destination end-station in the same edge-district partition can cause flooding only in that single edge-district partition and only in the case that the outbound-port associated with the <MAC, VID> has not yet been learned. The frame is not propagated outside that edge-district partition. The disclosure is described as applicable to a data center environment but it should be understood that the disclosure can be similarly applied to any layer 2 (L2) network.

Figure 1:
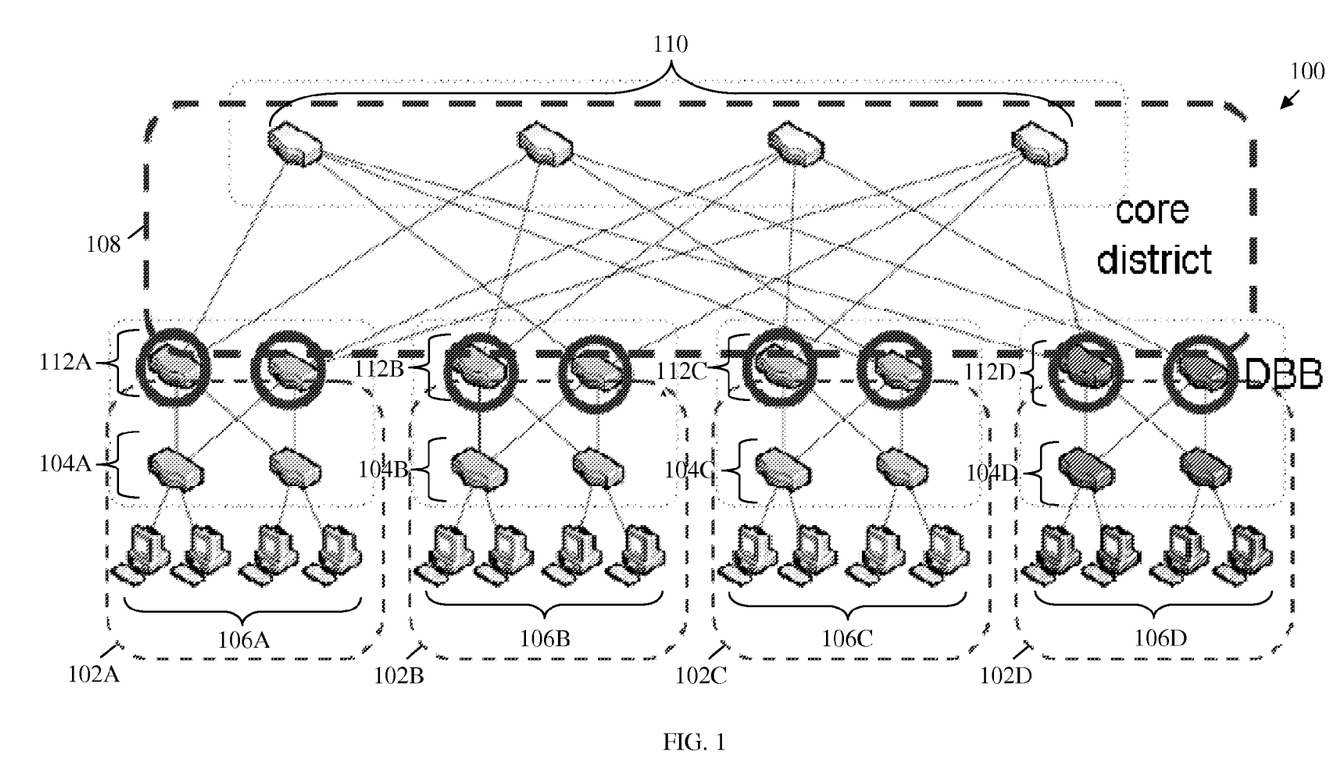
FIG. 1 is an embodiment of a partitioned data center network in accordance with an embodiment of the disclosure.

FIG. 1 shows a partitioned data center network 100 in accordance with an embodiment of the disclosure. Specifically, the partitioned data center network 100 has multiple edge-district partitions 102A-102D interconnected via a core-district 108 with core device group 110. Each of the edge-district partitions 102A-102D comprises a corresponding end-station group 106A-106D and a corresponding bridge device group 104A-104D. The partitioned data center network 100 also comprises a boundary bridge set 112A-112D, comprising one or more district boundary bridges (DBBs), for each of the edge-district partitions 102A-102D and separating the edge-district partitions 102A-102D from the core-district 108. The DBBs can be viewed as lying partly within the core-district partition and partly within the edge-district partition.

In FIG. 1, the devices may be Institute of Electrical and Electronic Engineers (IEEE) Standard 802.1Q compliant bridges, with extensions as described herein, and interconnected by point-to-point media. The partitioned data center network 100 may be organized in a redundant hierarchy known as a fat-tree. In at least some embodiments, there may be additional layers of hierarchy, for instance between top-of-rack (TOR) bridges in the bridge device groups 104A-104D and the end-stations in the end-station groups 106A-106D.

Figure 2:
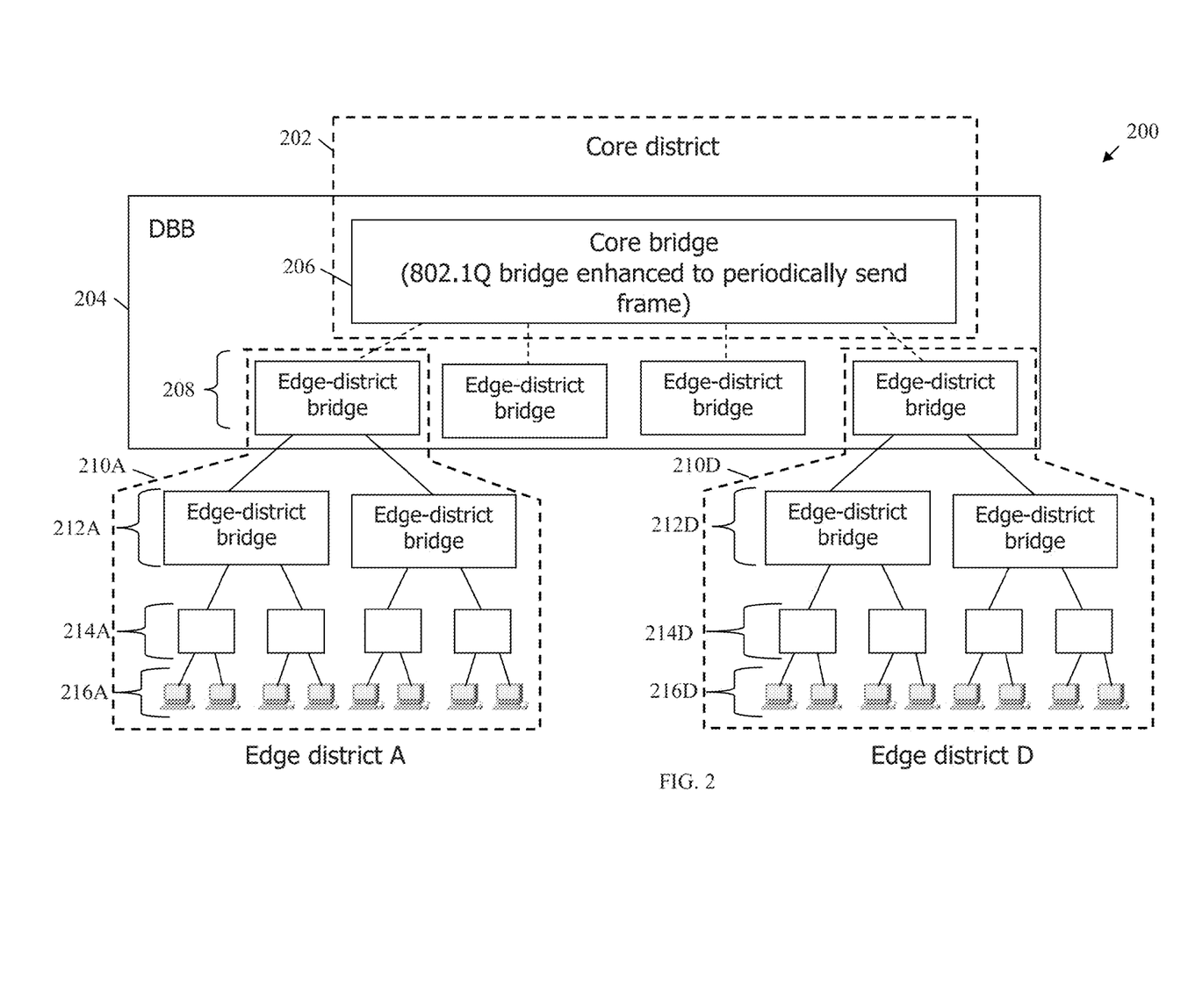
FIG. 2 is an embodiment of a partitioned data center network showing features of a DBB in accordance with an embodiment of the disclosure.

FIG. 2 is an embodiment of a partitioned data center network 200 showing features of a DBB 204 in accordance with an embodiment of the disclosure. As illustrated in FIG. 2, the DBB 204 is a bridge device containing a "core-bridge" 206, corresponding to an IEEE 802.1Q VLAN bridge with extensions as described herein, and containing an internal edge-district bridge 208, corresponding to an IEEE 802.1Q VLAN bridge with extensions as described herein, for each of the edge-district partitions 210A-210D attached to the DBB 204. Within each edge-district partition 210A-210D are respective edge-district bridge groups 212A-212D and respective end-station groups 216A-216D.

As shown, the core-bridge 206 of the DBB 204 is part of core district 202 and there is an internal link (i.e., internal point-to-point LAN) between the core bridge 206 and each edge-district bridge 208. It should be noted that a frame having a <DA, VID> not matching the edge-district FDB will be discarded by the edge-district FDB and not flooded into the edge-district partition. While the existence of a wildcard FDB entry (<*, VID>) in the edge-district bridge, as subsequently described, might cause the frame to be sent back towards the core bridge 206, the rule that a frame is not forwarded on the port on which it was received prevents this. Alternatively, the core bridge 206 can be enhanced to view an edge-bridge FDB and suppress forwarding of the frame if the <DA, VID> is not found in the edge-district FDB.

In FIG. 1, each edge-district bridge of bridge device groups 104A-104D, and in FIG. 2, each edge-district bridge 208 of DBB 204, maintains an FDB. Typically, each entry in an FDB consists of a <MAC, VID, port-map> triple with the combination of MAC and VID uniquely identifying the FDB entry. For unicast traffic, the port-map, which normally identifies a vector of ports, can be replaced by a single outbound-port value. When a frame transits a bridge, the values of the Source MAC address (SA) and VID contained in the frame header are placed in an FDB entry, if such an entry is not already present. This process is known as bridge-learning. If no free entries remain in the FDB, then the least recently referenced entry is displaced by the new entry. Entries not referenced for a specified period of time are aged from the FDB. If the Destination MAC address (DA) and VID contained in a received frame header are present in the FDB, the frame is forwarded on the outbound-port specified by the FDB entry. Otherwise, the frame is flooded on all ports in the member set of the VLAN except the port on which the frame was received.

With the partitioning shown for the partitioned data center network 100, the previously discussed issues of scale are addressed in the following manner. First, a bridge in an edge-district partition, including within the DBB, maintains FDB entries only for end-stations attached via that edge-district. The FDB entries are established by explicit configuration or by an equivalent means. When installed in the FDB, each such entry is associated with a NULL value of the outbound-port. A non-NULL value is subsequently established by bridge-learning. Bridge-learning is performed only when the <SA, VID> value of the received frame has been installed in the FDB, indicating that the source of the frame is local to the edge-district partition. The size of the district can be adjusted such the number of end-stations associated with the district is less than or equal to the capacity of the FDB. Such adjustment guarantees that unknown unicast frames are flooded within the district only in the case that the outbound-port value associated with the FDB entry has not yet been learned or has been aged. Aging results in setting the outbound-port value to NULL but does not result in the removal of the FDB entry. FDB entry displacement, and resultant flooding of unicast frames, will not occur. Second, when the SA and the DA lie within the same edge-district partition, flooding occurs only in that single edge-district partition. Flooding occurs only when the referenced FDB entry has a NULL outbound-port value as learning of the outbound-port value has not yet occurred or as a result of the change of an outbound-port value to NULL as might occur as a result of aging or Topology Change Notification (TCN). Alternatively, when the SA and the DA lie in different edge-district partitions, flooding of edge-district partitions occurs only in the single edge-district partition in which the DA is located. Flooding that does occur in the single destination edge-district is limited to cases in which learning of the outbound-port has not yet occurred, the outbound-port value has been aged, or the outbound-port value has been set to NULL as the result of a TCN. Flooding due to the displacement of FDB entries, that is, due to insufficient FDB size, does not occur. Flooding does not occur in the source edge-district partition or in any other edge-district partition that is not the destination edge-district partition. Thus, aggregate flooded traffic within edge-district partitions is reduced by a factor approximately corresponding to the number of edge-district partitions.

To reduce flooding in a partitioned data center network such as the data center network 100, various rules are deployed. The core-bridge of a DBB periodically sends a frame on each internal link (i.e., link to an internal edge-district bridge) having the header <MCAST-DBB-MAC, DBB-MAC, VID>, where MCAST-DBB-MAC and DBB-MAC are reserved MAC addresses. An edge-district bridge receiving a frame with the DA MCAST-DBB-MAC will propagate that frame on all bridge ports on the spanning tree associated with the specified VID except the port on which it was received. An edge-district bridge receiving a frame with the SA DBB-MAC on port in_port, will install the wildcard entry <*, VID, in_port> to be installed in its FDB. Installation of such an entry in the FDB will cause frames destined for locations outside the edge-district to be forwarded without flooding to the DBB.

The other methods described herein are applicable to the edge-district bridge, including the edge-district bridges within a DBB. First, an edge-district bridge, receiving a frame <MCAST-DBB-MAC, DBB-MAC, VID> on port in_port will install FDB entry <*, VID, in_port>. By the rules of IEEE 802.1Q bridge forwarding, this will cause subsequent data frames addressed to locations outside the local edge-district (i.e., not corresponding to a specific FDB entry) to be forwarded directly towards the DBB and not be flooded. Second, an edge-district bridge, on receiving the frame <MCAST-DBB-MAC, DBB-MAC, VID>, will forward the frame on all ports associated with the spanning tree identified by the VID except for the port on which the frame was received and any ports attaching directly to an end-station. Thus, in this embodiment, every edge-district bridge in the local edge-district will receive a frame sent to the destination MCAST-DBB-MAC by the local core-bridge. The disclosed technique uses bridge logic that specifically does not create an FDB entry <DBB-MAC, VID, in_port> when the frame <MCAST-DBB-MAC, DBB-MAC, VID> is received. Instead it installs the wildcard entry <*, VID, in_port>. Later, when a frame is received, destined for a location outside the local edge-district partition (i.e., <DA, VID> not in the FDB), the frame will match the wildcard FDB entry and will be forwarded as a unicast towards the DBB, thus avoiding flooding.

Should a failure occur in an edge-district bridge within a DBB or should a failure of the internal link between the core-bridge and an edge-district bridge occur, another edge-district bridge within the DBB may assume the functions of failed edge-district bridge. In such a case, the frame <MCAST-DBB-MAC, DBB-MAC, VID> will be sent by the bridge taking over for the failed edge-district bridge. Such a case may occur also when the internal link between the core-bridge and a DBB-internal edge-district bridge has failed. Such recovery requires that the bridge assuming the role of the failed bridge must have connectivity to the bridges of the local edge-district.

Further, each bridge within an edge-district partition, including an edge-district bridge internal to the DBB, contains an FDB entry corresponding to every <MAC, VID> pair associated with end-stations attached to that edge-district partition. This FDB entry rule may be enforced by configuring the end-stations to use the IEEE Std. 802.1Qbg Virtual Station Interface (VSI) Discovery Protocol (VDP) in order to announce their attachment to, or detachment from, a bridge associated with an edge-district partition. <MAC, VID> pairs associated with an end-station are propagated by the edge-bridge to all other bridges within the edge-district partition and to the DBB by flooding the frame <ADD-FDB-MAC, SA, VID> to add the entry <SA, VID> or the frame <DEL-FDB-MAC, SA, VID> to delete the entry <SA, VID>. ADD-FDB-MAC and DEL-FDB-MAC are MAC addresses reserved for the purpose of such addition and deletion. Such a frame is not forwarded by the DBB-internal edge-district bridge on the internal link to the core-bridge and is not flooded by a district-edge bridge towards a directly attached end-station. The above FDB entry rule may alternatively be enforced by configuring bridges within an edge-district partition by provisioning (with a management system) the <MAC, VID> values associated with end-stations attached to the edge-district partition. <MAC, VID> entries can be maintained in the FDB based on the currently provisioned end-stations. The above FDB entry rule may alternatively be enforced by configuring a host, on attachment to the network, to issue a gratuitous Address Resolution Protocol (ARP), which informs the edge-bridge of the presence of the end-station. The edge-bridge can then perform an ARP-based keep-alive protocol to determine when the end-station is withdrawn. Propagation of the information into an edge-district partition is then performed by the edge-bridge as described in first FDB entry rule enforcement technique.

Installed FDB entries do not necessarily contain a valid outbound-port value. Installation of the outbound-port value occurs as a result of the bridge-learning process on reception of data frames. When an FDB entry is installed without an outbound-port value, the value NULL is specified for this field. In this way, the FDB can maintain information about the current set of end-stations attached to an edge-district partition without awareness of the outbound-port value associated with each end-station.

Another rule to reduce flooding is based on a modified bridge-learning technique for bridges within an edge-district partition. More specifically, bridge-learning occurs only when the <SA, VID> value in the frame header is already installed as a <MAC, VID> pair in the FDB, indicating that the source end-station is attached to the edge-district. The <SA, VID> associated with a frame whose source end-station lies outside the local edge-district is not learned. A further modification of bridge-learning is possible in the case of a tree shaped topology. In this case, bridge-learning can be enabled on end-station-facing ports and disabled on core-facing ports.

Another rule to reduce flooding is based on modifying bridge forwarding for bridges within an edge-district partition. More specifically, if the <DA, VID> specified in a frame header is not found in the FDB, the frame is forwarded based on the outbound-port value specified by the wildcard FDB entry (<*, VID>). That is, if the <DA, VID> does not lie in the local edge-district partition, the frame is forwarded towards the DBB. Alternatively, if the <DA, VID> is found in the FDB but the outbound-port value is NULL, the frame is flooded. That is, if the <DA, VID> lies in the local edge-district partition but has not yet been learned, the frame is flooded in a manner similar to the case of an unknown unicast when districts are not deployed. If the <DA, VID> is found in the FDB and the outbound-port value is not NULL, the frame is forwarded on the indicated outbound-port. That is, if the <DA, VID> lies in the local edge-district partition and has been learned, then the frame is forwarded in a manner similar to the case of a known unicast when districts are not deployed. The edge-district bridge internal to the DBB, on receiving a frame from the local edge-district partition, does not forward that frame to the core-bridge (i.e., on the internal link) if FDB lookup indicates that the <DA, VID> lies in the local edge-district partition. That is, flooded frames are not propagated beyond the local edge-district partition. The edge-district bridge internal to the DBB, on receiving a frame from the core-bridge, does not forward that frame into its associated edge-district partition if the specified <DA, VID> is not present in the FDB associated with its associated edge-district.

To summarize, the partitioned data center network 100 corresponds to a system with at least one edge-district partition having edge-district bridges and end-stations, where the edge-district bridges are configured to reduce flooding in the local edge-district partition when a frame originating inside the local edge-district partition has a destination that is outside the local edge-district partition. The system also includes a district boundary bridge associated with the edge-district partition, where the district boundary bridge contains an edge-district bridge configured to eliminate flooding in the local edge-district partition when a frame originating outside the local edge-district partition has a destination that is inside the edge-district partition.

When a system such as a partitioned data center network 100 comprises a plurality of edge-district partitions, a district boundary bridge is implemented for each edge-district partition and the edge-district partitions communicate with each other via bridges of the core-district. In such a system, each district boundary bridge is configured to eliminate flooding within its associated edge-district partition when a frame originates outside its associated edge-district partition and has a destination that is outside its associated edge-district partition.

In accordance with at least some embodiments, each boundary bridge in a system such as partitioned data center network 100, stores an FDB having a local edge-district portion comprising a set of <MAC, VID> entries that are not subject to removal by aging or displacement and that are related to end-stations within its associated edge-district partition, and having a core-district portion comprising a set of learned address entries that are subject to aging and displacement and that are related to components outside of its associated edge-district partition. Each district boundary bridge (when active) contains a core-bridge that is configured to periodically flood a frame towards its associated edge-district partition, where the frame comprises a predetermined address that will cause the frame to be distributed to all bridges within the edge-district partition.

In accordance with at least some embodiments, each edge-district bridge of a given edge-district partition in a system such as a partitioned data center network 100 stores an FDB that comprises a set of <MAC, VID> entries that are not subject to removal by aging or displacement and that comprises a wildcard address entry (<*, VID>) for all addresses not included in the set of <MAC, VID> entries. In such embodiments, each edge-district bridge of a given edge-district partition installs the port-number associated with the wildcard FDB entry on receiving the frame <MCAST-DBB-MAC, DBB-MAC, VID> periodically flooded into the edge-district by the core-bridge of the DBB. After the port information for the wildcard FDB entry has been specified, bridging logic will cause a frame with <DA, VID> received by the edge-district bridge but not found in the FDB to be forwarded on the single port specified by the wildcard FDB entry. This will cause the frame to be forwarded as a unicast towards the DBB.

Figure 3:
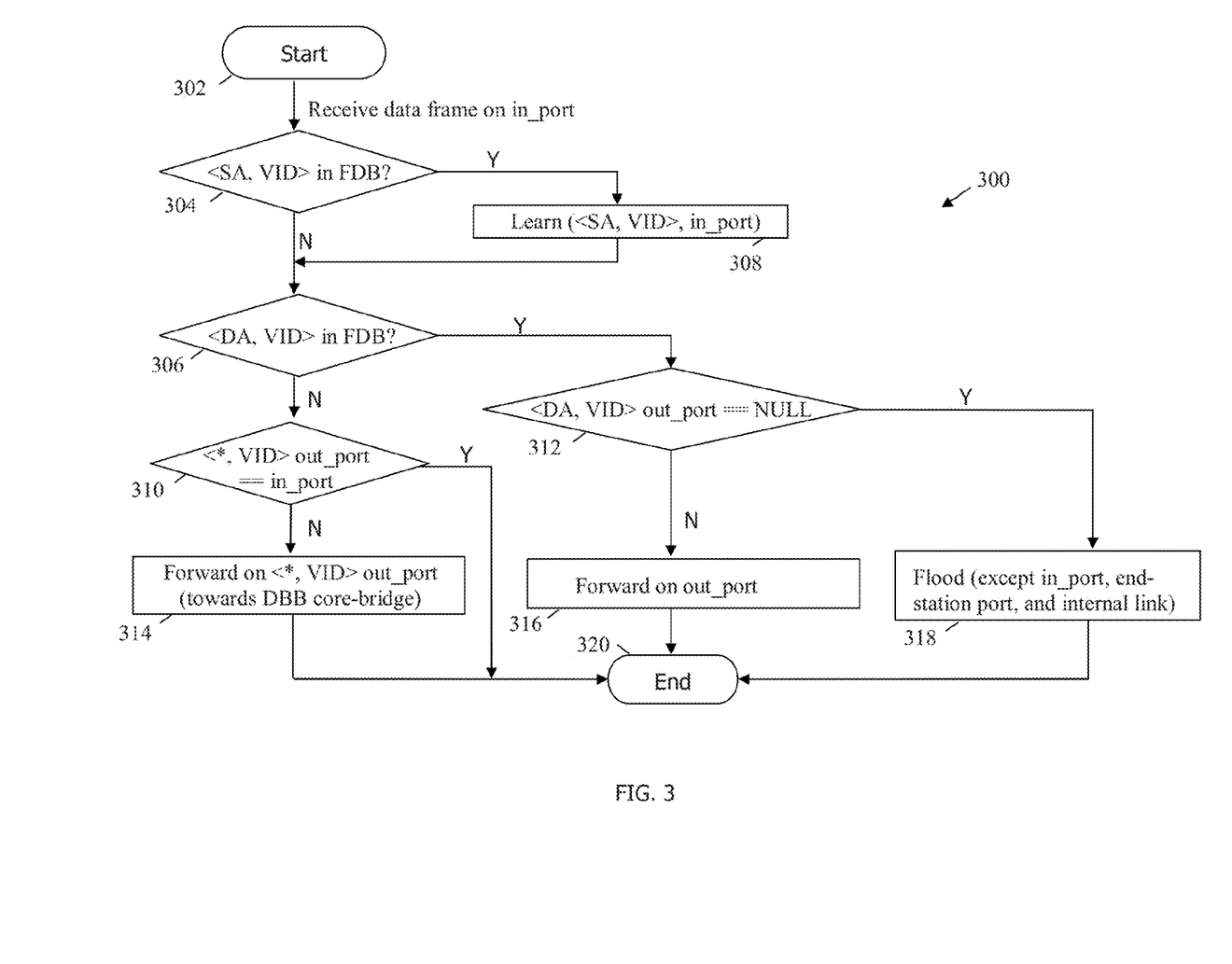
FIG. 3 is a flowchart showing a method performed at a bridge within an edge-district partition, including an edge-bridge contained within a DBB, in accordance with an embodiment of the disclosure.

FIG. 3 is a flowchart showing a method 300 performed at a bridge within an edge-district partition in accordance with an embodiment of the disclosure. As shown, the method 300 starts at block 302 when a data frame is received on an in-port of a bridge within an edge-district partition. At decision block 304, a determination is made regarding whether the <SA, VID> pair provided with the data frame is in the FDB of the bridge. If so, the FDB is updated to include the information <SA, VID>, in_port at block 306 (i.e., the in_port information related to the <SA, VID> entry in the FDB is recorded). If the <SA, VID> pair provided with the data frame is not in the FDB of the bridge (determination block 304) or if <SA, VID>, in_port has already been learned at block 308, a determination is made at block 306 regarding whether the <DA, VID> pair provided with the data frame is in the FDB of the bridge. If so, a determination is made at block 312 regarding whether <DA, VID> out_port is set to NULL. If so, the data frame is flooded to all ports of the bridge except the in_port, ports directly attached to end-stations, and the port associated with the internal link between an edge-district bridge and a core-bridge within a DBB at block 318 and the method 300 ends at block 320. Alternatively, if <DA, VID> out_port is not set to NULL (determination block 312), the data frame is forwarded on out_port at block 316 and the method ends at block 320.

Returning to determination block 306, if the <DA, VID> pair provided with the data frame is not in the FDB of the bridge, a determination is made at block 310 regarding whether <*, VID> out_port is set to in_port. If so, the method 300 ends at block 320. Alternatively, if <*, VID> out_port is not set to in_port (determination block 310), the data frame is forwarded on <*, VID> out_port at block 314 (towards the DBB core-bridge) and the method 300 ends at block 320.

Figure 4:
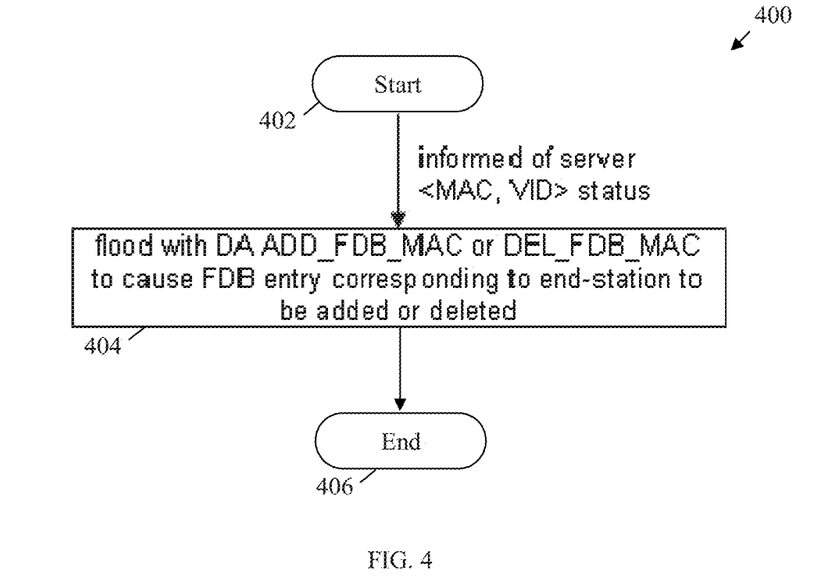
FIG. 4 is a flowchart showing another method performed at a bridge within an edge-district partition, including an edge-bridge contained within a DBB, in accordance with an embodiment of the disclosure.

FIG. 4 is a flowchart showing a method 400 performed at an edge-bridge of an edge-district partition in accordance with an embodiment of the disclosure. The process may be performed, for example, when an IEEE 802.1Qbg VDP request is received or the edge-bridge becomes aware by some other means that a <MAC, VID> associated with an end-station needs to be added to or removed from the FDB of Bridges within the district. As shown, the method 400 starts at block 402 when the edge-bridge is informed of a server <MAC, VID> status. At block 404, the edge-bridge performs a flood operation with DA ADD_FDB_MAC to cause an FDB entry corresponding to the end-station related to the server <MAC, VID> status to be added or performs a flood operation with DA DEL_FDB_MAC to cause an FDB entry corresponding to the end-station related to the server <MAC, VID> status to be deleted. The method 400 subsequently ends at block 406.

Figure 5:
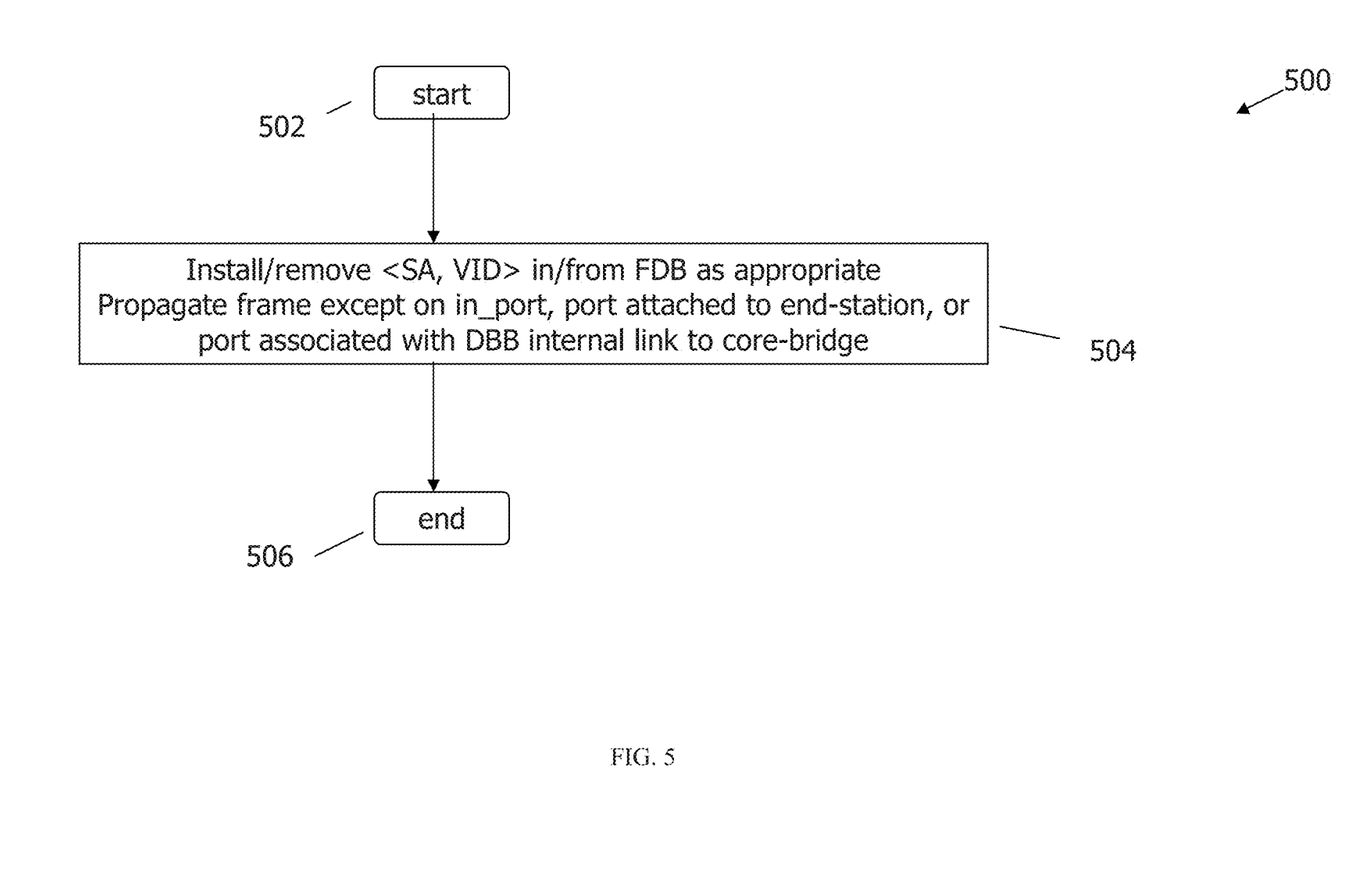
FIG. 5 is a flowchart showing a method performed at an edge-bridge of an edge-district partition, including an edge-bridge contained within a DBB, in accordance with an embodiment of the disclosure.

FIG. 5 is a flowchart showing a method 500 performed at the edge-district bridges of an edge-district partition in accordance with an embodiment of the disclosure. The process or flowchart 500 may be performed, for example, when a frame carrying the reserved destination MAC address ADD-FDB-MAC or DEL-FDB-MAC is received. As shown, the method 500 starts at block 502 when a frame with DA equal to ADD_FDB_MAC or equal to DEL_FDB_MAC is received on an in_port. At block 504, the <SA, VID> pair is installed into or removed from the FDB as appropriate. If the receiving entity is determined to be an edge-bridge of an edge-district partition (decision block 506), the frame is propagated except on edge-ports at block 508 and the method 500 ends at block 516. If the receiving entity is determined to not be an edge-bridge of an edge-district partition (decision block 506), the frame is propagated except on an internal link to a core-bridge 510 and the method 500 ends at block 516.

To summarize, a communication bridge of a system such as the partitioned data center networks 100 and 200 may perform a method that comprises receiving a frame and determining that a source of the frame is within a local edge-district partition and that a destination of the frame is outside the local edge-district partition. In response to this determination, the communication bridge forwards the frame towards a destination outside the local edge-district partition without flooding the frame to the local edge-district partition.

Normally, in an edge-district bridge, learning occurs whenever the <SA, VID> is found in the FDB. In such case, what is learned is only the out-bound port, since the <SA, VID> is already in the FDB. In an alternative scheme, a bridge may also determine whether a source address and a VLAN identifier associated with a frame should be learned by an FDB based on whether the frame is received on a core-facing port or an edge-facing port. Since learning is done in hardware, it takes more logic to learn selectively (i.e., additional effort of determining when to learn) than to just learn all the time. Thus the alternative method may not be preferred.

In at least some embodiments, the communication bridge maintains an FDB comprising entries that are not subject to removal by aging or displacement. When the communication bridge corresponds to the core-bridge of a district boundary bridge, the core-bridge periodically floods a frame towards the local edge-district partition, where the frame comprises a predetermined address that causes the frame to be distributed to all edge-district bridges in the local edge-district partition. When the communication bridge corresponds to a district boundary bridge, the bridge can be logically partitioned into a core-bridge and an edge-district bridge corresponding to each attached edge-district such that each edge-district bridge is interconnected with the core bridge via a point-to-point communications link internal to the DBB device.

The partitioning technique and flooding reduction rules disclosed herein provide various benefits. For example, the number of FDB entries required by a bridge within an edge-district partition of a data center network is bounded in order to prevent resultant flooding of unknown unicast frames. Additionally, flooding of unknown unicast frames is performed only in the edge-district in which the destination end-station resides. Additionally, <MAC, VID> pairs communicated from end-station to bridge using IEEE 802.1Qbg edge virtual bridging (EVB) VSI Discovery Protocol (VDP) are propagated throughout the local edge-district by flooding that uses reserved ADD_FDB_MAC and DEL_FDB_MAC destination MAC addresses.

Additionally, Internet Protocol (IP) ARP may be utilized to determine when an end-station is attached to an edge-district and detached from an edge-district. Further, the bridges within an edge-district, including the edge-district bridge within the DBB, may be notified when an end-station has been attached to or detached from the edge-district. Further, when the end-station communicates to the edge-bridge that it has attached to or detached from the edge-bridge, the edge bridge can further propagate this information throughout the edge-district partition through the use of the Multiple Registration Protocol (MRP) MAC Registration Protocol (MMRP) specified by IEEE 802.1ak.

At least some of the features/methods described in the disclosure may be implemented in a network apparatus or component, such as an Ethernet or Internet Protocol (IP) node. For instance, the features/methods in the disclosure may be implemented using hardware, firmware, and/or software installed to run on hardware. The network apparatus/component or node may be any device that transports frames through a network, e.g. Ethernet or IP network. For example, the network apparatus/component may include bridges, switches, routers, or various combinations of such devices.

Figure 6:
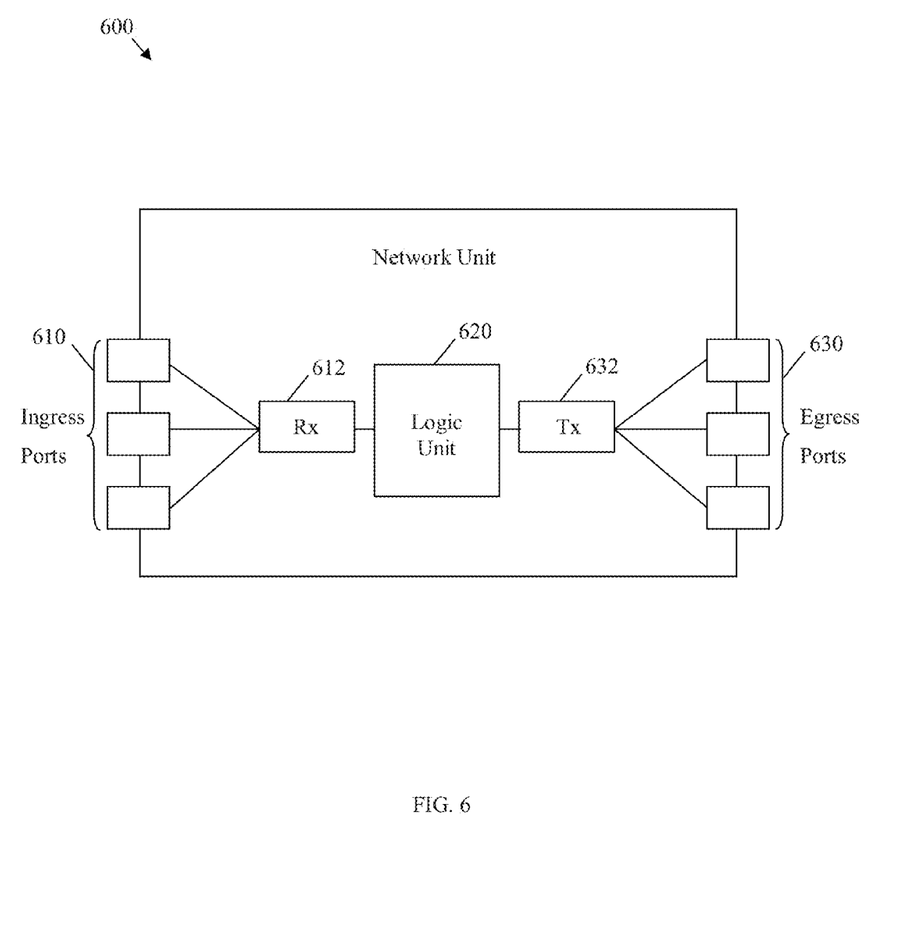
FIG. 6 shows a network component in accordance with an embodiment of the disclosure.

FIG. 6 illustrates an embodiment of a network unit 600 in accordance with an embodiment of the disclosure. The network unit 600 may comprise one or more ingress ports or units 610 coupled to a receiver (Rx) 612 for receiving signals and frames/data from other network components. The network unit 600 may comprise a logic unit 620 to determine which network components to send data to. The logic unit 620 may be implemented using hardware, software, or both. The network unit 600 may also comprise one or more egress ports or units 630 coupled to a transmitter (Tx) 632 for transmitting signals and frames/data to the other network components. The receiver 612, logic unit 620, and transmitter 632 may also implement or support the methods shown in FIGS. 3, 4, and 5 above. The components of the network unit 600 may be arranged as shown in FIG. 6.

In accordance with at least some embodiments, the logic unit 620 of a network component such as network unit 600 is configured to eliminate flooding in a local edge-district partition associated with the network unit 600 for a frame whose source is inside the local edge-district partition and whose destination is outside the local edge-district partition. Further, the logic unit 620 is configured to limit a number of entries in an FDB in accordance with a predetermined edge-district partition of a data center network.

In at least some embodiments, the logic unit 620 stores an FDB comprising a set of entries that are not subject to removal by aging or displacement. Further, the logic unit 620 enables the network unit 600 to behave as an edge-district bridge, which does not learn from frames associated with source addresses lying outside the local edge-district partition. In at least some embodiments, the logic unit 620 is configured to determine between sending a received data frame to an out_port, sending the received data frame to an <*, VID> out_port, or flooding the received data frame to all ports except the internal link to the core-bridge of a DBB.

In at least some embodiments, the logic unit 620 enables the network component 600 to behave as a local edge-district bridge, which performs bridge-learning only for frames whose <SA, VID> corresponds to an FDB entry <MAC, VID> and wherein only the outbound-port value is updated. Further, the logic unit 620 may cause the network component 600 to periodically send frames with <MCAST-DBB-MAC, DBB-MAC, VID> towards the edge-district on an internal link. Further, the logic unit 620 may store a FDB comprising a set of <MAC, VID> entries that are not subject to removal by aging and or displacement and additionally comprising, for each VID associated with the network component, a wildcard FDB entry <*, VID> matching all MAC addresses for a given VID for FDB entries for which there is not a more specific match. Further, the logic unit may be configured to specify port information for the wildcard FDB entry based on a frame carrying a reserved DA value such as MCAST-DBB-MAC and a reserved SA value such as DBB-MAC received from a core-bridge of a DBB associated with the local edge-district partition. Further, the logic unit may be configured to forward a received frame towards the boundary bridge via the port associated with the wildcard FDB entry when the received frame comprises a <DA, VID> that does not correspond to a <MAC, VID> contained within the FDB.

For more information regarding VLAN-bridging, reference may be had to IEEE Std. 802.1Q-2011 VLAN Bridging. For more information regarding edge-bridging, reference may be had to IEEE Std. 802.1Qbg Edge Virtual Bridging.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of broader terms such as comprises, includes, and having should be understood to provide support for narrower terms such as consisting of, consisting essentially of, and comprised substantially of. All documents described herein are incorporated herein by reference.

What is claimed is:

1. A network component, comprising:
    an ingress port;
    a plurality of egress ports;
    a memory unit comprising a filtering database (FDB), wherein the FDB comprises:
        a plurality of medium access control (MAC) address and Virtual Local Area Networks (VLAN) Identifier (VID) (<MAC, VID>) entries; and
        a wildcard FDB entry corresponding to a VLAN associated with the network component, and
    a logic unit coupled to the ingress port, the egress ports, and the memory unit, wherein the logic unit is configured to:
        receive a frame from the ingress port that comprises a destination MAC (DMAC) address and a VID;
        determine whether the DMAC and the VID from the frame matches one of the <MAC, VID> entries; and
        forward the frame using the wildcard FDB entry when the DMAC and the VID does not match an <MAC, VID> entry,
    wherein every local address within the edge-district network has a corresponding <MAC, VID> entry within the FDB.

2. The network component of claim 1, wherein the logic unit is further configured to add an additional <MAC, VID> entry to the FDB when receiving a second frame that comprises a source address, a second VID, and a reserve MAC address that indicates an instruction to add the additional <MAC, VID> entry.

3. The network component of claim 2, wherein the logic unit is further configured to propagate the second frame to all other network components within the edge-district network.

4. The network component of claim 1, wherein the logic unit is further configured to propagate the <MAC, VID> of an associated or de-associated end station via a Multiple Registration Protocol (MRP) MAC Registration Protocol (MMRP) specified by Institute of Electrical and Electronics Engineers (IEEE) 802.1ak.

5. The network component of claim 1, wherein the network component is attached to one of the end stations, and wherein the logic unit is further configured to infer the association of one of the <MAC, VID> entries that corresponds to the one of the end stations with the network component on receipt of a gratuitous Address Resolution Protocol (ARP) message and infer the de-association via an ARP-based keep-alive procedure.

6. The network component of claim 1, wherein the network component is attached to a core-bridge via an internal link, wherein the core-bridge is located outside the edge-district network, wherein the logic unit is further configured to receive a periodically transmitted frame of the form <MCAST-DBB-MAC, DBB-MAC, VID> on the internal link from the core-bridge, and wherein the periodically transmitted frame is used to install the wildcard FDB entry within the memory unit.

7. The network component of claim 1, wherein the memory unit is configured to be no larger than approximately the number of end-stations associated with the edge-district network.

8. The network component of claim 1, wherein the logic unit is further configured to learn an outbound port value that corresponds to the one of the <MAC, VID> entries when receiving a second frame that comprises a Source MAC address and a second VID that matches the one of the <MAC, VID> entries.

9. The network component of claim 8, wherein the second frame is received via the ingress port, and wherein the learned outbound port value identifies the ingress port.

10. The network component of claim 1, wherein each of the <MAC, VID> entries are associated with an outbound port value, and wherein the frame is forwarded to all of the egress ports except for an egress port that is associated with the ingress port when the DMAC and the VID matches one of the <MAC, VID> entries and the outbound port value that corresponds to the one of the <MAC, VID> entries is a null value.

11. The network component of claim 10, wherein the DMAC identifies a destination node that is located outside the edge-district network when the frame is forwarded using the wildcard FDB entry, and wherein the frame is transmitted as a unicast frame when forwarding the frame using the wildcard FDB entry.

12. The network component of claim 10, wherein the logic unit is further configured to forward the frame to one of the egress ports when the DMAC and the VID matches the one of the <MAC, VID> entries and the outbound port value that corresponds to the one of the <MAC, VID> entries identifies the one of the egress ports.

13. The network component of claim 1, wherein the logic unit is further configured to delete the one of the <MAC, VID> entries to the FDB when receiving a second frame that comprises a source address, a second VID, and a reserve MAC address that indicates an instruction to delete the one of the <MAC, VID> entries, and wherein the one of the <MAC, VID> entries is not subject to deletion caused from the memory unit exceeding a maximum number of free entries stored by the memory unit.

14. A system for managing flooding in a partitioned data center network, comprising:
 a core bridge; and
 an edge-district bridge coupled to the core bridge and that corresponds to an edge-district of the partitioned data center network,
 wherein the edge-district bridge is connected by an internal point-to-point link to the core-bridge,
 wherein the edge-district bridge is configured to:
  maintain a filtering database (FDB) that comprises a plurality of FDB entries and a wildcard FDB entry;
  forward a received frame to the core bridge when the received frame comprises a destination address that maps to the wildcard FDB entry; and
  flood the received frame to a plurality of bridges located within the edge-district of the partitioned data center network when the destination address maps to one of the FDB entries that does not contain a valid outbound port value, and
 wherein the destination address references a destination outside the edge-district of the partitioned data center network when the destination address maps to the wildcard FDB entry.

15. The system of claim 14, wherein the core bridge is located outside the edge-district of the partitioned data center network, wherein the flood frame is not transmitted to the core bridge, and wherein the edge-district bridge is further configured to discard a second received frame from the core bridge when the second received frame comprises a second destination address that does not match any of the FDB entries within the FDB.

16. The system of claim 14, wherein the received frame is transmitted as a unicast frame to the core bridge when the received frame comprises a destination address that maps to the wildcard FDB entry, wherein the received frame is forwarded as a unicast frame via an output port to a node located within the local edge-district partition when the destination address maps to one of the FDB entries that contains a valid outbound port value, and wherein the valid outbound port value identifies the output port.

17. A method comprising:
 receiving, by a communication bridge, a frame;
 determining, by the communication bridge, whether a source of the frame is within a local edge-district partition and whether a destination of the frame is outside the local edge-district partition;
 determining whether the destination of the frame maps to a filtering database (FDB) entry that identifies an output port to forward the frame;
 flooding the frame to a plurality of nodes located within local edge-district partition when the frame maps to the FDB entry that does not identify the output port to forward the frame; and
 forwarding the frame towards a destination node located outside the local edge-district partition without flooding the frame within the local edge-district partition when the source of the frame is within the local edge-district partition and the destination of the frame is outside the local edge-district partition.

18. The method of claim 17, wherein the frame comprises a destination medium access control (MAC) address and a Virtual Local Area Networks (VLAN) Identifier (VID), and wherein the method further comprises forwarding the frame towards a core-bridge without flooding based on a wildcard entry in the FDB when the destination MAC address and the VID does not match any of the entries in the FDB.

19. The method of claim 17, further comprising learning an outbound port value that identifies the output port for the FDB entry when a second received frame comprises a source MAC address and a VID that matches the FDB entry, wherein the outbound port value identifies a port on which the second received frame is received.

20. The method of claim 17, further comprising on receipt of a second frame with a reserved MAC address identified as in-port, updating an outbound port field of a wildcard FDB entry for a specified VLAN with the value of in-port.

* * * * *